G. HEELEY.
MOTION TRANSMISSION GEAR.
APPLICATION FILED NOV. 17, 1911.
1,148,227.
Patented July 27, 1915.
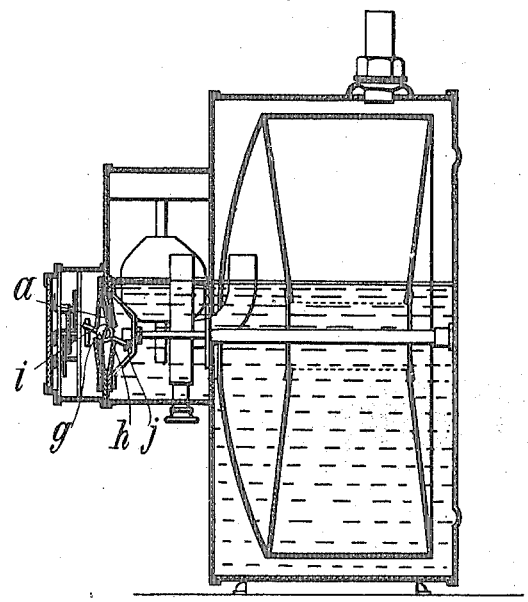
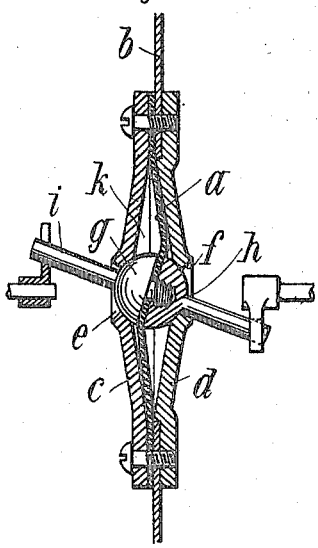
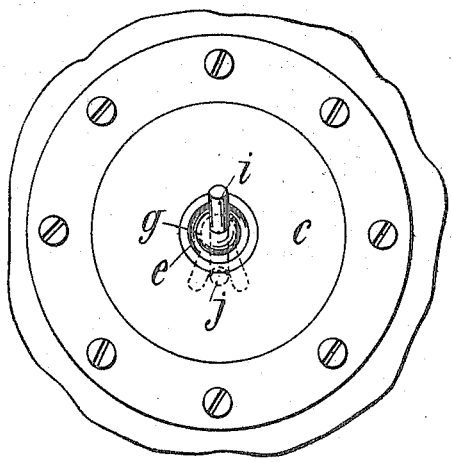

UNITED STATES PATENT OFFICE.

GEORGE HEELEY, OF PARIS, FRANCE, ASSIGNOR TO COMPAGNIE POUR LA FABRICATION DES COMPTEUSS ET MATÉRIÉL D'USINES À GAZ, OF PARIS, FRANCE.

MOTION-TRANSMISSION GEAR.

1,148,227.   Specification of Letters Patent.   Patented July 27, 1915.

Application filed November 17, 1911. Serial No. 660,872.

*To all whom it may concern:*

Be it known that I, GEORGE HEELEY, a citizen of the French Republic, residing at Paris, France, have invented certain new and useful Improvements in Motion-Transmission Gear, of which the following is a specification.

The connection of a transmitting or driving mechanism or of a motor to a receiving mechanism, situated respectively in mediums submitted to different pressures, requires a mutual airtight insulation between the two mechanisms, in order to prevent any communication between the two mediums which would allow the fluid in one of them, namely that of a higher pressure, to escape into the medium of lower pressure. This particular problem of connection presents in the case of gas meters either with fly wheels or bellows in which the measuring part is arranged in a compartment exposed to the pressure of the fluid, and transmits the movement imparted to it by this fluid, to a counting mechanism by means of the shaft traversing a stuffing gland, with or without a water seal. For the gas meters with fly wheels which generally have only to carry pressures not exceeding a few centimeters of water, the water seal may suffice to insure hermetic sealing of the connection, but if the pressure of the gas were to rise above the limit of the water seal, the gas would force back the liquid and pass through the pressure gland if as often happens, the latter is not absolutely airtight, hence there arise leakages varying in importance with the gas pressure. For the dry gas meters this inconvenience is still more to be feared, for the employment of a water seal is then impossible.

The present invention relates to a process and devices for constructing a tight joint, which will allow one and the same part to move in two distinct media, containing fluids at equal or different pressures, these media remaining hermetically shut off from each other without any leakage of the fluids or communication between the two. This result is obtained by means of a deformable airtight diaphragm, serving as a support to an organ to which the transmitting mechanism or motor imparts a movement of circular oscillation operating the receiving mechanism.

A device by means of which this process can be carried out, is given by way of example in the accompanying drawing, in which—

Figure 1 represents a side elevation, in section, of a gas meter with fly wheel, according to this invention; Fig. 2 is a section on a larger scale of the essential portions of the device; Fig. 3 gives a front view.

This device consists of a diaphragm $a$, preferably of circular form, of deformable material (leather, rubber, etc.) pressed with its peripheral edge against the corresponding edge of an opening made in the partition separating the two compartments to be insulated, and between the corresponding peripheral edges of two conical cups $c$, $d$ having their apices opposite each other. These cups are provided with central openings $e$, $f$, against the edges of which rests a ball free to rotate in every direction. This latter is composed of two semispherical parts $g$, $h$ assembled together in any suitable manner and inclosing between them the central part of the diaphragm $a$. The semispherical parts have at either end in the direction of their polar diameters, rods $i$, $j$ forming generatrices of two opposite cones whose common apex coincides with the center of the ball $g$, $h$, while their axis coincides with the common axis of the two cups. One of these rods is driven by the transmitter or motor, either by means of a fork, or by means of a cam or by any other driving part which imparts to it an oscillating motion following a cone of revolution, without rotating about itself, while the other rod transmits this motion to the receiving mechanism, by means of a crank-disk, fork or any other suitable device. It will be clear from these devices that the diaphragm $a$ constitutes an absolutely tight joint, which, no matter what the pressure be to which it is exposed, the fluid (lighting gas or any other) traversing the compartment in which the driving, transmitting or measuring part is situated, will never allow this fluid to find an outlet for passing outside or into the compartment containing the receiving mechanism or counter. On the other hand, this diaphragm $a$ serves as a movable support for the intermediate kinematic organ connecting the two mechanisms situated in the two mediums which are entirely isolated from one another, all the more so because the ball $g$ can be ground to fit the cup against which it is pushed by the fluid exposed to the higher pressure, which should suffice to insure a tight joint, provided that the grinding has been perfectly done.

The space between the two cups can be filled with any lubricant, which, not being able to escape outside, remains in contact with the diaphragm and keeps it flexible.

It is to be noted that the undulatory circular movement which the diaphragm $a$ undergoes during its deformation, does not affect in any way the volume of the compartment $k$ the undulations successively taking place in the two compartments, being of opposite directions and thus neutralize the volumes displaced by them.

The device given above, are only given as an example, the forms, materials, dimensions, details of construction and applications may all vary without departing from the spirit of the invention.

What I claim as my invention and desire to secure by Letters Patent is:—

1. In a mechanism for transmitting power from one side of a gastight partition to another, the combination with such a partition of two truncated conical cups secured to opposite faces of the partition about an aperture therein said cups having openings at their apices and provided about the inner ends of said openings with spherical seats, a ball supported by said seats and provided with oppositely projecting crank arms which extend through the openings at the apices of the cups, and a diaphragm arranged between the cups and connected thereto and to the ball.

2. In a mechanism for transmitting power from one side of a gastight partition to another, the combination with such a partition of a diaphragm extending across an aperture in the partition, two truncated conical cups positioned against opposite faces of the partition and inclosing the diaphragm, means securing the cups to the partition and retaining the diaphragm in place, said cups having openings at their apices and provided with suitable seats about the inner ends of said openings, and means supported by said seats within the cups and movable by the diaphragm, including arms that extend outwardly through the openings in the apices of the cups.

In testimony whereof I have signed my name to this specification in the presence of two subscribing witnesses.

GEORGE HEELEY.

Witnesses:
 VICTOR DUPONT,
 GEORGES BORNSENIL.